United States Patent
Walker et al.

(10) Patent No.: US 9,574,383 B1
(45) Date of Patent: Feb. 21, 2017

(54) SELF-LOCKING HINGE MECHANISM

(71) Applicant: CNH INDUSTRIAL AMERICA, LLC, New Holland, PA (US)

(72) Inventors: Eric L. Walker, Narvon, PA (US);
Brian P. Crow, Rock Island, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/844,938

(22) Filed: Sep. 3, 2015

(51) Int. Cl.
| | |
|---|---|
| *E05D 7/10* | (2006.01) |
| *A01D 75/00* | (2006.01) |
| *E05D 11/06* | (2006.01) |
| *E05D 3/02* | (2006.01) |

(52) U.S. Cl.
CPC ............. *E05D 7/1066* (2013.01); *A01D 75/00* (2013.01); *E05D 3/02* (2013.01); *E05D 7/1061* (2013.01); *E05D 11/06* (2013.01); *Y10T 16/5408* (2015.01)

(58) Field of Classification Search
CPC ........ E05D 7/1061; E05D 7/1066; E05D 1/00; E05D 1/06; E05D 2007/1094; E05D 2007/128; E05D 7/10; E05D 7/12; E05D 7/121
USPC .......................................................... 16/350
See application file for complete search history.

(56) References Cited

U.S. PATENT DOCUMENTS

| | | | |
|---|---|---|---|
| 689,315 A | 12/1901 | Krueger | |
| 920,936 A | 5/1909 | Eschbach | |
| 3,833,964 A * | 9/1974 | Harcourt | A47K 3/325 16/291 |
| 4,131,378 A * | 12/1978 | Daws | E05D 3/12 16/287 |
| 4,210,068 A * | 7/1980 | Baker | B29C 65/18 156/583.9 |
| 4,482,023 A * | 11/1984 | Dziedzic | E05C 1/04 16/262 |
| 4,501,045 A * | 2/1985 | Boyer | E05D 11/06 16/331 |
| 4,750,238 A | 6/1988 | Rock et al. | |
| 5,040,269 A * | 8/1991 | Lyons, Jr. | E05D 5/0215 16/254 |

(Continued)

FOREIGN PATENT DOCUMENTS

| | | |
|---|---|---|
| DE | 3539576 A1 | 5/1987 |
| DE | 102009031388 A1 | 1/2011 |

*Primary Examiner* — Jeffrey O Brien
(74) *Attorney, Agent, or Firm* — Peter K. Zacharias; Patrick M. Sheldrake

(57) ABSTRACT

A self-locking hinge for agricultural machine panels includes a receptacle configured to slidingly receive an insert along a receiving axis. A hinge with fixed and movable portions and pivot axis transverse to the receiving axis is connected to the insert. A locking retainer is connected to the movable portion and engages an opening in the receptacle as the movable portion is moved toward a first position corresponding with panel closure. Engagement of the locking retainer in the opening precludes movement of the insert portion along the receiving axis. Moving the hinge in an opposite direction disengages the locking retainer from the opening and permits sliding movement of the insert. The locking retainer further includes an arcuate surface configured to engage an edge of the opening which may further be eccentrically arranged about the hinge axis to enable the locking retainer to move the insert into a desired position as the hinge is moved toward the first position.

11 Claims, 3 Drawing Sheets

(56) References Cited

U.S. PATENT DOCUMENTS

| | | | | | |
|---|---|---|---|---|---|
| 5,361,455 | A | * | 11/1994 | Kiefer | E05D 3/022 16/235 |
| 6,357,081 | B1 | * | 3/2002 | Bender | E05D 7/121 16/201 |
| 6,890,196 | B2 | * | 5/2005 | Vila | E05D 1/06 16/257 |
| 6,907,642 | B1 | * | 6/2005 | Czipri | B63B 17/02 114/364 |
| 7,003,849 | B2 | * | 2/2006 | Cohen | A63C 11/221 16/232 |
| 7,007,967 | B2 | * | 3/2006 | Goettker | B60D 1/167 280/479.2 |
| 7,080,428 | B2 | * | 7/2006 | Hyde | E05D 7/1061 16/231 |
| 7,131,166 | B2 | * | 11/2006 | Cohen | A63C 11/221 16/232 |
| 2002/0164197 | A1 | * | 11/2002 | Lee | E05D 3/022 403/65 |
| 2004/0000030 | A1 | * | 1/2004 | Pleiman | A45C 13/005 16/267 |
| 2015/0300064 | A1 | * | 10/2015 | Edavana | E05D 3/022 16/231 |

* cited by examiner

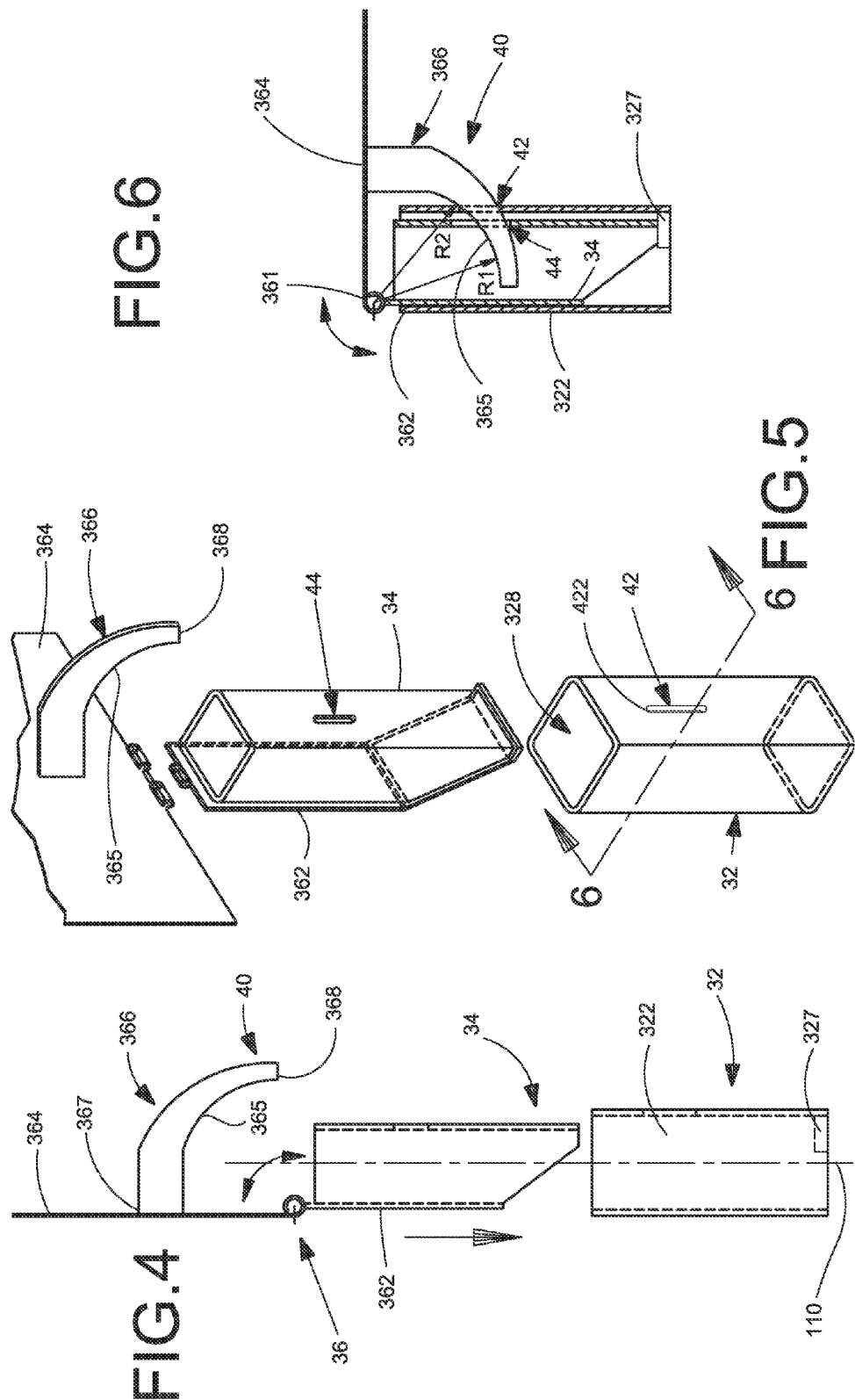

US 9,574,383 B1

SELF-LOCKING HINGE MECHANISM

BACKGROUND OF THE INVENTION

The present invention relates generally to agricultural machines having moveable panels to provide access to internal areas, and, more particularly to a hinge mechanism that enables easy removal of the access panel in one position while preventing removal of the panel while in a second position.

Many harvesting machines and headers employ movable hoods or panels to provide access to the machine internals. These panels are typically hingedly connected to provide convenient access for routine inspections. Oftentimes the panels are removable to afford even greater access to the machine internals, such as for component service or replacement. The conventional method for panel removal involves detaching the hinges on which the panel swings from the machine structure, typically secured by bolted connections. Panel removal thus requires a time-consuming removal of multiple fasteners. Furthermore, loose fasteners are easily misplaced which adds further complication to reinstalling the panels.

It would be advantageous to provide an improved connection for an access panel on an agricultural machine that would permit hinged opening and closing of the panel for routine access as well as allow the panel to be easily removed from the machine without requiring tools for removal.

SUMMARY OF THE INVENTION

Accordingly, the present invention, in any of the embodiments described herein, may provide one or more of the following advantages:

It is an object of the present invention to provide a self-locking hinge for movable panels used on agricultural machines that enable easy, tool-free removal of the panel from the machine. A machine mounted receptacle slidingly receives an insert. A hinge having a fixed and a movable portion is connected to the insert. A locking retainer is connected to the movable portion and configured to engage an opening in the receptacle as the movable portion is moved toward a first position. Engagement of the locking retainer and the opening, caused when moving the hinge toward the first position precludes sliding movement of the insert portion. Moving the hinge in a direction opposite of the first direction disengages the locking retainer from the opening and permits sliding movement of the insert relative to the receptacle, including removal of the insert from the receptacle which detaches the panel from the machine.

It is a further object of the present invention to provide a self-locking hinge for movable panels used on agricultural machines that replaces a conventional movable panel hinge and permits conventional hinged movement of the panel. A conventional hinge is connected to an insert which is selectively disposed in a receptacle fixed to the machine chassis. The hinge permits movement of the panel in generally opposing first and second directions without requiring that the insert be slidingly disengaged from the receptacle.

It is a further object of the present invention to provide a self-locking hinge for movable panels used on agricultural machines that includes a machine mounted receptacle configured to slidingly receive an insert. A hinge having a fixed and a movable portion is connected to the insert. A locking retainer is connected to the movable portion and configured to engage an opening in the receptacle as the movable portion is moved toward a first position. The locking retainer includes an arcuate surface configured to engage an edge of the opening to prevent the insert from being slidingly removed from the receptacle. The arcuate surface is eccentrically arranged about the hinge pivot so that the insert is slidingly moved to a desired position as the hinge is pivoted toward the first position by interaction between the arcuate surface and the edge.

It is a still further object of the present invention to provide a self-locking hinge for movable panels used on agricultural machines that is durable in construction, inexpensive of manufacture, carefree of maintenance, easily assembled, and simple and effective to use.

These and other objects are achieved by providing a self-locking hinge for movable panels used on agricultural machines includes a machine mounted receptacle configured to slidingly receive an insert along an receiving axis. A hinge having a fixed and a movable portion and pivot axis transverse to the receiving axis is connected to the insert. A locking retainer is connected to the movable portion and configured to engage an opening in the receptacle as the movable portion is moved toward a first position corresponding with panel closure. Engagement of the locking retainer in the opening, caused when the hinge is moved toward the first position, precludes movement of the insert portion along the receiving axis. Moving the hinge in a direction opposite of the first direction disengages the locking retainer from the opening and permits sliding movement of the insert relative to the receptacle. The locking retainer further includes an arcuate surface configured to engage an edge of the opening which may further be eccentrically arranged about the hinge axis to enable the locking retainer to move the insert into a desired position as the hinge is moved toward the first position.

BRIEF DESCRIPTION OF THE DRAWINGS

The advantages of this invention will be apparent upon consideration of the following detailed disclosure of the invention, especially when taken in conjunction with the accompanying drawings wherein:

FIG. 4 is a side view of the self-locking hinge mechanism shown with the insert portion positioned for insertion into the receptacle;

FIG. 5 is an exploded perspective view of the self-locking hinge mechanism of FIG. 4; and FIG. 6 is a side view of the self-locking hinge mechanism shown in the first (closed and locked) position.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
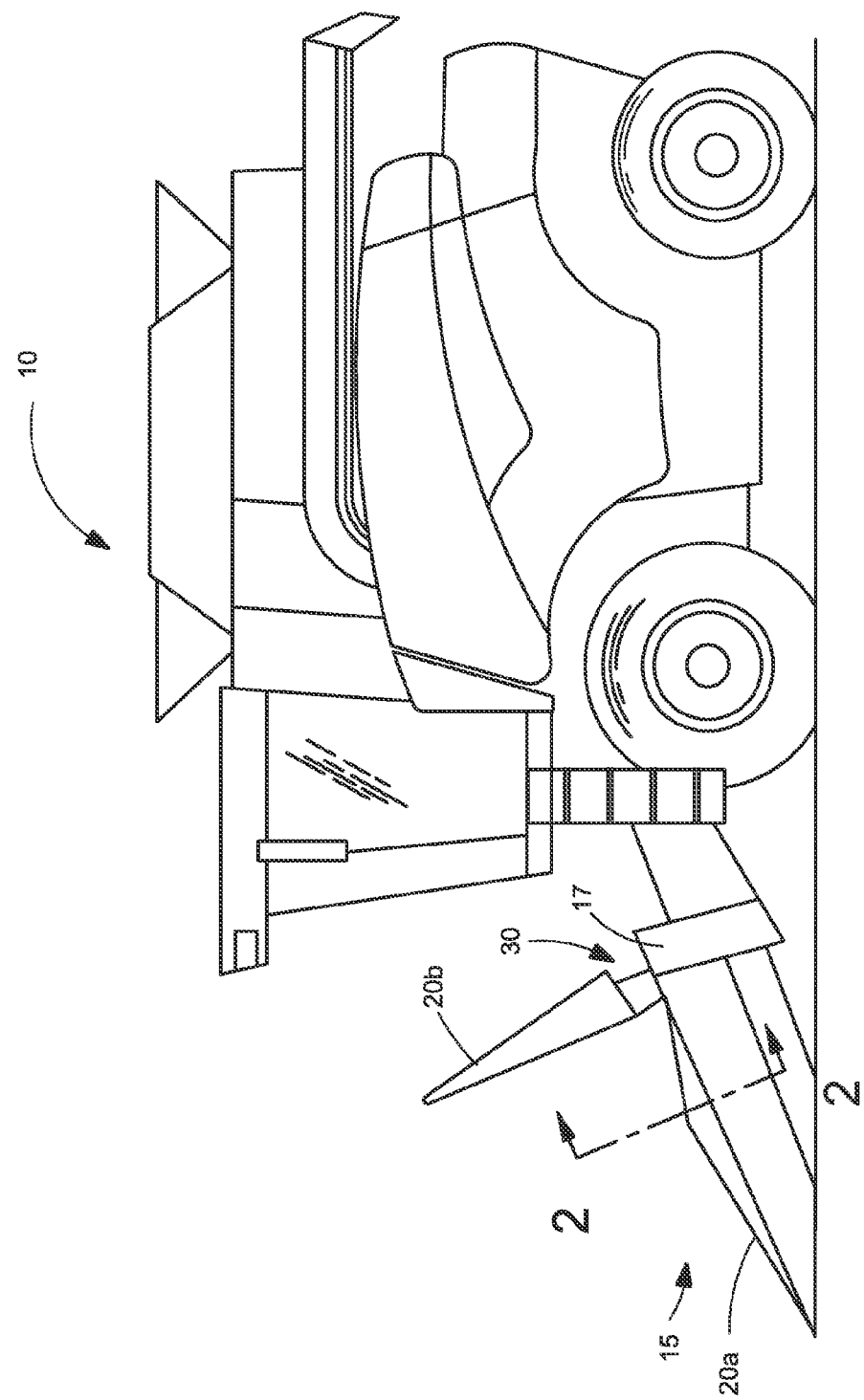
FIG. 1 is a side view of an agricultural harvesting machine, which is a combine, including a header on which the present invention is useful.
Figure 3:
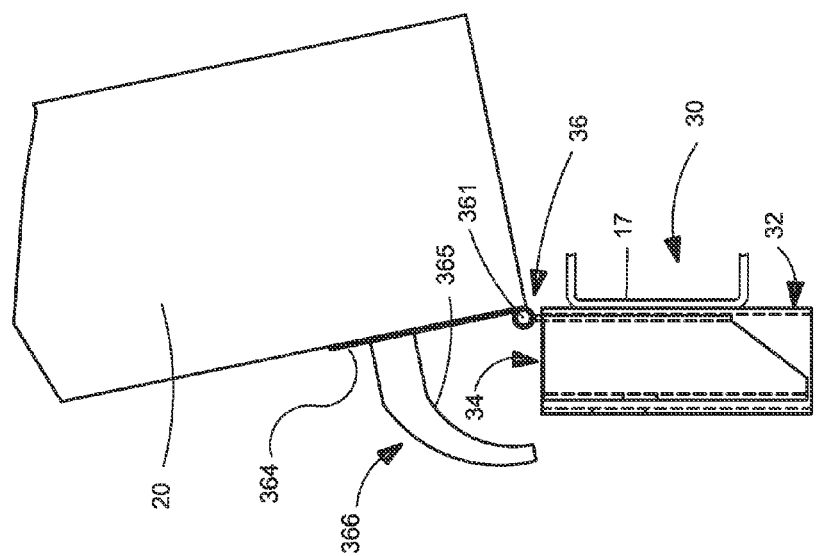
FIG. 3 is side view of the self-locking hinge mechanism shown in FIG. 2.
Figure 2:
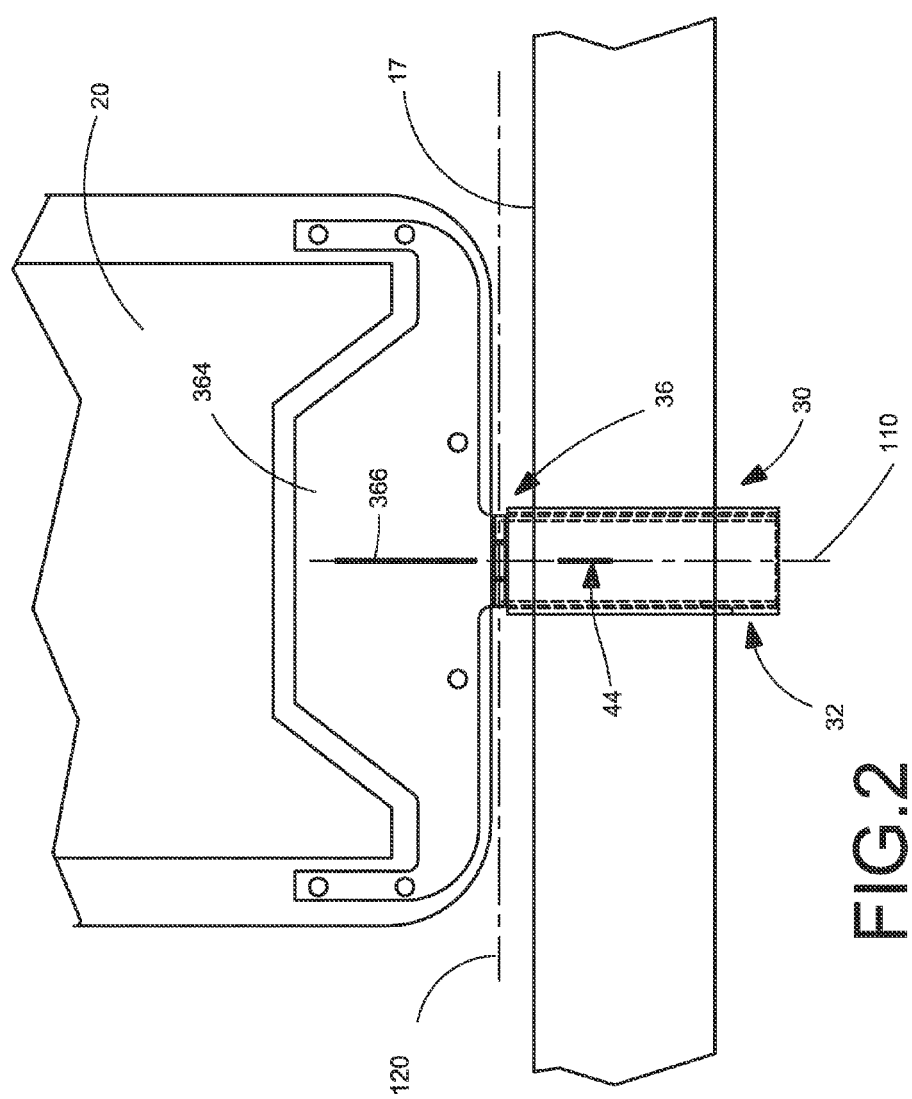
FIG. 2 is a partial elevation view of a movable panel from the header of FIG. 1 showing the self-locking hinge mechanism of the present invention.

Referring to the figures, FIG. 1 illustrates a conventional agricultural machine, a crop harvester 10 in this instance, having a forwardly mounted header 15 for processing a standing crop as the harvester moves across a field. It is common to provide one or more moveable panels 20 at various locations on the header as part of an overall protective shroud for the header. The panels 20 are conventionally hinge-connected to the machine chassis and may be positioned in a first position (closed, panel 20a in FIG. 1) to contain crop and other debris within the machine, prevent the expulsion debris made airborne by impact with a rotary cutter, and/or generally create, in conjunction with the remainder of the shroud, a boundary separating the inner mechanism of the machine from exterior locations where people may be present. Moving the panels to a second position (opened, panel 20b in FIG. 1) allows an individual to gain access to the interior of the machine to permit access for maintenance or repair of the machine internals. The panels may include latches to retain them in the closed position or they may be oriented so that gravity maintains them in the closed position. Such arrangements are well known in the art.

It is often necessary to detach the moveable panels 20 from the machine to provide additional access for certain repairs to or replacement of the machine internals. The present invention reduces the effort necessary to remove the panels from the machine by providing a self-locking hinge assembly 30 that connects the panels to the machine chassis. Multiple mechanisms may be used dependent upon the number and size of the moveable panels on the machine.

Referring now to FIGS. 2-6, the self-locking hinge assembly 30 includes a receiver 32 attached to the machine chassis 17 and an insert 34. The receiver 32 and insert 34 are configured to be engaged and disengaged by movement along a receiving axis 110. In the embodiment illustrated, the receiver 32 includes a wall member 322 surrounding an interior space 328 having a generally rectangular cross-section area. The insert 34 is an elongate member configured with a generally rectangular exterior cross-section area that may be slidingly received within the interior space 328. The relative sizing of the cross sectional areas is sufficiently similar to limiting lateral movement between the insert 34 and the receiver 32 while permitting sliding movement along the receiving axis 110. It is also anticipated that the relative orientation and configuration of the receiver 32 and the insert 34 could be reversed such that the insert 34 is externally disposed on the receiver 32.

The length of the insert 34 and the receiver 32 is sufficient to provide a stable interface when the insert 34 is fully engaged in the receiver 32, as shown in FIG. 6.

The self-locking hinge assembly 30 further includes a hinge 36 having a fixed portion 362 connected to the insert 34 and moveable connector 364 pivotally connected thereto by a pivot ping 361 or the like. The moveable connector 364 is pivotable about a pivot axis 120 in generally opposing directions between extremes corresponding to first (open) (FIG. 6) and second (closed) (FIG. 2) positions. The pivot axis 120 is generally transversely oriented to the receiving axis 110. The moveable panel 20 is connected to the moveable connector 364 and thus may also be pivoted between open and closed positions.

Detachment of the movable panel 20 from the machine 10 requires moving the insert 34 (connected to the panel by the hinge 36) upwardly along the receiving axis 110 until it disengages from the receiver 32. The movable panel 20 may be reconnected to the machine by aligning the insert 34 with the receiver 32 and then moving the insert 34 along the receiving axis 110 until it is engaged (surrounded by) the receiver 32. A stop 327 may be provided to prevent the insert 34 from being inserted too far into the receiver 32. Engagement of the insert in the receiver to an extreme position could interfere with movement of the panel 20.

In order to prevent unintended or accidental movement of the insert that could lead to disengagement from the receiver, a locking assembly 40 is provided which engages the fixed portion, preferably the receiver 32, when the hinge and panel are in specific positions, ideally corresponding to the panel being in the closed position (FIG. 6). Apertures 42, 44 may be provided in both the receiver 32 and the insert 34, the apertures aligning when the insert 34 is fully engaged in the receiver (FIG. 6). A locking member 366 is connected at a proximal end 367 to the movable connector 364 or the panel 20 for movement therewith. The locking member 366 includes an generally arc-shaped arcuate surface 365 which may be symmetric with an arc center coinciding with the pivot axis 120 and a cross sectional profile that generally matches the configuration of the apertures 42, 44 thereby allowing the locking member 366 to be extended through the apertures. The locking member 366 is aligned so that pivotal movement of the panel/movable connector causes the distal end 368 to be inserted into the apertures 42, 44, which are displaced from the pivot axis 120 a similar amount as the radial displacement of the locking member arcuate surface 365, when the insert 366 is fully engaged and the panel is pivoted toward the closed position. The locking member 366 terminates at a distal end 368, the positioning of the distal end 368 being such that the locking member 366 may be fully disengaged from the apertures 42, 44 within the range of pivoting movement afforded by the hinge 30. When the locking member 366 is inserted into the apertures 42, 44, the insert 34 is prevented from disengagement movement along the receiving axis 110.

In another embodiment, the length of the insert 34 is less than the length of the radius of the arcuate surface 365 or similarly configured to preclude interaction with the arcuate surface 365. In this arrangement, only the receiver 32 requires an aperture 42 into which the locking member 366 may be engaged.

In another embodiment, the arcuate surface 365 is eccentrically arranged about the pivot axis 120 and configured so that the radial distance from the pivot axis 120 to arcuate surface 365 decreases as the hinge 36 pivots toward the closed position. An initial radius $R_1$ is established at a hinge pivot position corresponding to initial contact between edge 422 of the aperture 42 and the arcuate surface 365 proximate to the distal end 368. The radial distance between the pivot axis 120 and the arcuate surface 365 is reduced with continued pivoting movement of the hinge 36 from the initial contact pivot position toward the closed position, at which point the radial separation is shown as $R_2$. As the radial distance is reduced, the locking member 366 pulls the insert 34 more fully into engagement with the receiver 32 until the closed position is reached. The radial separation from the pivot axis 120 is similar for the arcuate surface 365 and the edge 422 in the closed position. FIG. 6 best illustrates the varying radial separations wherein the initial radius $R_1$, is greater than the final radius $R_2$, corresponding to the pivot position at which the locking member 366 is fully engaged and the movable portion has reached the first (closed) position. The configuration provides a secure connection between the hinge 36 and the machine chassis 17 which reduces the likelihood of rattles and other unwanted movement during machine operation.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A self-locking hinge assembly for an agricultural machine comprising:
   a receiver portion;
   an insert portion configured to be inserted into the receiver portion by movement along a receiving axis;
   a movable connector hingedly connected to the insert portion and pivotable about a pivot axis between generally opposing first and second positions; and
   a locking member connected to the movable connector for movement therewith, the locking member configured to engage the receiver portion when the insert portion is engaged with the receiver portion and the moveable connector is in the first position, engagement thereof inhibiting movement of the insert portion along the receiving axis, the locking member being disengaged from the receiver portion when the hinge is in the second position and allowing movement of the insert portion along the receiving axis for disconnecting the insert portion from the receiver portion.

2. The hinge assembly of claim 1, wherein the pivot axis is transversely aligned to the receiving axis.

3. The hinge assembly of claim 2, wherein the receiver portion includes an opening transversely aligned with the receiving axis, the locking member being configured to extend through the opening to retain the insert portion in a fixed position relative to the receiver portion.

4. The hinge assembly of claim 3, wherein the locking member includes an arcuately shaped surface configured to engage an edge of the opening as the moveable connector pivots.

5. The hinge assembly of claim 4, wherein the arcuately shaped surface is eccentrically arranged about the pivot axis.

6. The hinge assembly of claim 5, wherein the eccentricity reduces the radial separation between the pivot axis and the arcuately shaped surface as the hinge is moved toward the first position.

7. A self-locking hinge assembly for an agricultural machine comprising:
   a receptacle defined by a side wall for affixing to the machine, the receptacle having a receiving axis and at least one opening in the side wall;
   an elongate insert portion having distal and proximal ends, the insert portion configured to be slidingly received by the receptacle by movement along the receiving axis and positionable within the receptacle in at least an engaged position;
   a hinge having a fixed and a movable portion, the fixed portion connected to the proximal end, the moveable portion being moveable between generally opposing first and second positions; and
   a locking member connected to the movable portion for movement therewith, the locking member configured to engage the at least one opening when the insert portion is in the engaged position and the hinge is in the first position, engagement thereof inhibiting movement of the insert portion along the receiving axis, the locking member being disengaged from the at least one opening when the hinge is in the second position and allowing movement of the insert portion along the receiving axis for disconnecting the insert portion from the receptacle.

8. The hinge assembly of claim 7, wherein the hinge is movable about a pivot axis transversely aligned to the receiving axis.

9. The hinge assembly of claim 8, wherein the locking member includes an arcuately shaped surface configured to engage an edge of the opening as the moveable connector pivots.

10. The hinge assembly of claim 9, wherein the arcuately shaped surface is eccentrically arranged about the pivot axis.

11. The hinge assembly of claim 10, wherein the eccentricity reduces the radial separation between the pivot axis and the arcuately shaped surface as the hinge is moved toward the first position.

\* \* \* \* \*